United States Patent [19]
Antier et al.
[11] 3,739,467
[45] June 19, 1973

[54] METHOD OF FABRICATION OF A WIRED MAGNETIC MEMORY PLANE

[75] Inventors: Guy Antier, St-Martin le-Vinoux; Gérard Nicolas, Grenoble, both of France

[73] Assignee: Commissariat A L'Energie Atomique, Paris, France

[22] Filed: May 17, 1971

[21] Appl. No.: 144,114

[52] U.S. Cl. ..... 29/604, 340/174 PW, 340/174 MA
[51] Int. Cl. .......... H01f 7/06
[58] Field of Search .......... 29/604; 340/174 PW, 340/174 VA, 174 S, 174 MA

[56] References Cited

UNITED STATES PATENTS

| | | | |
|---|---|---|---|
| 3,631,592 | 1/1972 | Wilson | 29/604 |
| 3,501,830 | 3/1970 | Bryzinski et al. | 29/604 |
| 3,495,228 | 2/1970 | Bryzinski et al. | 340/174 PW |
| 3,538,599 | 11/1970 | Michand et al. | 29/604 |
| 3,448,514 | 6/1969 | Reid et al. | 29/604 |
| 3,534,471 | 10/1970 | Babbitt et al. | 29/604 |

*Primary Examiner*—Charles W. Lanham
*Assistant Examiner*—Carl E. Hall
*Attorney*—Cameron, Kerkam & Sutton

[57] ABSTRACT

The method consists in forming a layer of substantially parallel lead-wires which are insulated with respect to each other and in forming by molding between the two faces of said layer which is folded in two a series of housings in the form of tunnels which are substantially parallel to each other but perpendicular to said lead-wires and are each adapted to accommodate a magnetic wire.

13 Claims, 21 Drawing Figures

METHOD OF FABRICATION OF A WIRED MAGNETIC MEMORY PLANE

A wire-type memory plane is constituted by a set of parallel magnetic wires such as, for example, wires formed of beryllium-copper alloy and having a diameter of 125 microns, on which a magnetic coating of nickel-iron alloy (in proportions respectively of 17 percent and 83 percent) having a thickness of 1 micron has been applied by electrodeposition, and by a set of pairs of lead-wires which are also parallel to each other but at right angles to the magnetic wires and surround these latter, the writing of binary information on said magnetic wires being carried out by means of magnetic fields produced by said pairs of lead-wires. A "memory core" is therefore constituted by the intersection between a magnetic wire and a pair of lead-wires. The magnetic wires constitute the digit leads whilst the lead-wires which surround these latter constitute the word drive-leads or word leads or alternatively word-line leads.

It is always endeavored to obtain memory planes which exhibit :

high "memory-core" densitites per square centimeter in order to reduce the propagation times and thus to obtain very short storage cycles, capacities (that is, numbers of "memory cores" per plane) which are as high as possible in order to reduce the lines of connection between planes as well as the number of soldered joints.

There are at present in existence wired memory planes in which the word leads consist of enamelled wires which are woven around the magnetic wires. The woven wire fabric is laid on a glass plate which serves as a support. The mechanical strength of the plane is provided by the wire fabric itself as well as by the soldered joints which interconnect the enamelled wires and magnetic wires. However, this arrangement is subject to the following disadvantages :

the copper wires have a tendency to stretch in the course of time, thereby resulting in lateral slackening of the fabric ; this therefore makes it necessary to employ additional wires in order to maintain the enamelled wires in adjacent relation ;

coating of the complete assembly of wires is not feasible since it would in that case no longer be possible to replace defective wires ;

the wire fabric principle does not permit strict superposition of the two lengths of the word lead ; the magnetic field which is produced does therefore not coincide with the axis of the magnetic wire and this is liable to cause errors in writing ;

since the two lengths of the word lead are not superposed and the magnetic wires cannot be drawn together to any considerable extent by reason of the meshes of the fabric, there is a resultant loss of space which is in turn liable to cause a limitation in the density of "memory cores" ;

the wire fabric principle does not make it possible to construct planes having a large surface area since the enamelled wires slacken all the more readily as they are of greater length. The largest planes which have been constructed up to the present time comprise 64 words of 64 digits, which corresponds to 4,096 "memory cores." In order to construct a memory having $5 \times 10^5$ cores, it is therefore necessary to interconnect more than 100 unitary planes of this type, which is a serious obstacle to the construction of a high-speed memory or, equivalently, store ;

the wire fabric technique calls for a large number of soldered joints on the enamelled wires, which reduces the reliability of the memory.

There also exist memory planes in which the word line leads are formed either from printed circuits obtained by etching on a flexible support or by means of flat lead-wires which are rolled and coated with various plastic materials. This design is less costly than the method previously mentioned but affords a lower degree of precision, especially by reason of the variations in positioning of the rolled lead-wires within the thickness of the plastic sheath and also as a result of variations in the width of these wires (approximately 20 percent). In these two types of design, the memory plane proper is made up of two parts which are assembled together, a flexible word-circuit (printed or rolled) and a tunnel plane which is formed separately by molding various resins, thereby ensuring mechanical strength and positioning of the magnetic wires and also permitting interchangeability. The word circuit surrounds the tunnel plane on both faces and the assembly is usually carried out by means of double-face adhesive fabric. Under these conditions, the two lengths of word lead are superposed and the magnetic field which is produced accordingly coincides with the axis of the magnetic wire. The main disadvantage of this arrangement lies in the substantial distance between the word lead and the magnetic wire. In fact, this distance from the drive lead results in a reduction in amplitude of the magnetic field and in poor localization of said field, which is in turn liable to cause leakage to adjacent words and therefore to limit the word density to a considerable extent. Moreover, in order to form a double word loop with the printed or rolled circuits, it is necessary to employ the technique of metallized holes ; however, this is a costly operation which cannot be employed in the case of high densities.

The present invention proposes a method of fabrication of a wired magnetic memory plane which makes it possible in particular to overcome the disadvantages inherent in the arrangements referred-to above and especially to ensure :

positioning and mechanical strength of the magnetic wires ;

the possiblity of replacement of defective magnetic wires ;

excellent proximity between the word lead and the magnetic wire in order to obtain maximum yield between the word drive-current and the magnetic field which is applied at the level of each memory point.

The method according to the invention primarily consists in forming a layer of substantially parallel lead-wires which are insulated with respect to each other and in forming between the two faces of said layer which is folded in two a series of housings which are substantially parallel to each other but perpendicular to said lead-wires and each adapted to accommodate a magnetic wire.

In this design, provision is therefore no longer made for two assembled parts consisting of the word leads and the housings but for a single unit since the housings are formed only from the layer of lead-wires.

This invention is also concerned with the wired magnetic memory planes which are obtained by means of said method.

Further properties of the invention will become apparent from the following description which is given by way of explanation but not in any limiting sense, reference being made to the accompanying drawings, in which :

FIG. 7 illustrates the method whereby the layer of parallel and adherent electric lead-wires is wound on a support ;

FIG. 8 shows said layer ;

FIG. 9 shows the method adopted for winding the assembly of spacer threads (or wires) on the layer of electric lead-wires ;

FIG. 10 shows said assembly which is bonded to the layer of lead-wires ;

FIG. 11 shows the manner in which the layer of electric lead-wires is folded-back on each side of the array of spacer threads (or wires) ;

FIGS. 12, 13 and 14 show one mode of procedure which is adopted for the purpose of positioning the magnetic wires prior to folding of the layer of electric lead-wires ;

FIG. 15 shows electric lead-wires which are wound around the assembly of spacer threads (wires) and form a plurality of loops without discontinuities ;

FIGS. **16, 17, 18, 19*a*, 19*b* and 19*c*** illustrate the method adopted for winding the electric lead-wires onto the support and folding-back these latter on each side of the assembly of spacer threads in order that each electric lead-wire should form two loops which surround the layer of spacer wires without any discontinuity.

A first alternative embodiment of the invention entails two essential steps ; in the first step, a layer of enamelled wires which will constitute the word drive-leads of the memory plane is formed by winding on an adhesive support ; in the second step, there is formed between the two faces of said folded layer a series of parallel housings in which the magnetic wires will be placed.

Figures 1, 2:
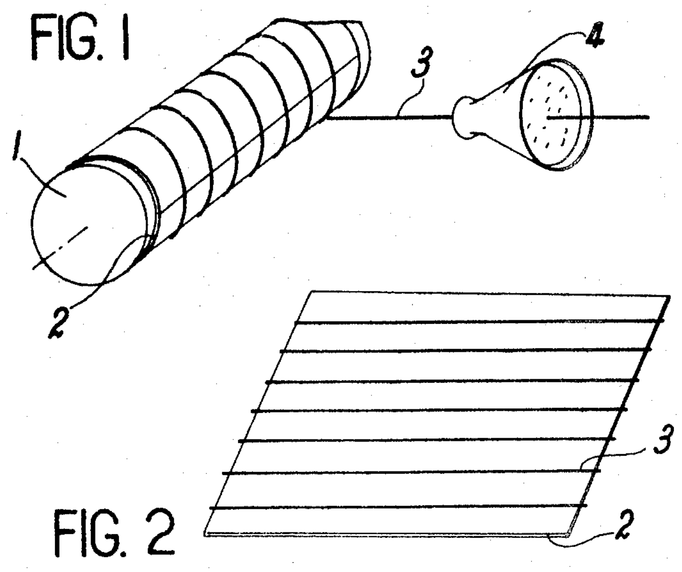
FIGS. 1 to 4 illustrate the different stages of construction of a memory plane in a first alternative embodiment of the method according to the invention.

The wire which is employed for the purpose of forming the layer of word leads has a diameter of approximately 80 μ and is insulated by reinforced thermosetting enamel having a thickness of a few microns. As shown in FIG. 1, there is placed on a cylindrical drum 1 a doubleface flexible adhesive sheet 2 which is protected by a lining of silicone-treated paper. The enamel wire 3 which is freed from impurities by passing through a conical filter 4 made of compressed polyester foam is then wound onto the outer adhesive face of the cylinder. Sorting of the wires which are intended to constitute the inputs and outputs of the word lines as well as the intersections in the case of a number of outward and return sections in one word line is carried out during this operation. When the winding is completed, the adhesive sheet 2 is cut along a generatrix of the cylinder. There is thus provided a layer of word lines having a predetermined pitch and configuration. This layer which is therefore formed of an array of substantially parallel enamelled lead-wires and of a flexible adhesive support to which said array is bonded is shown diagrammatically in FIG. 2.

Figure 3:
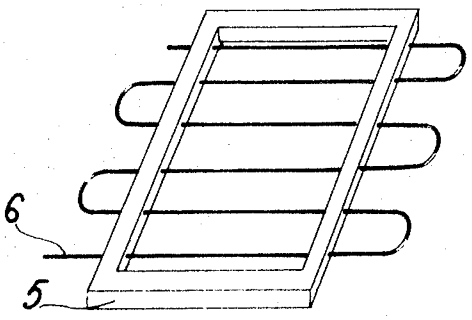
Figure 4:
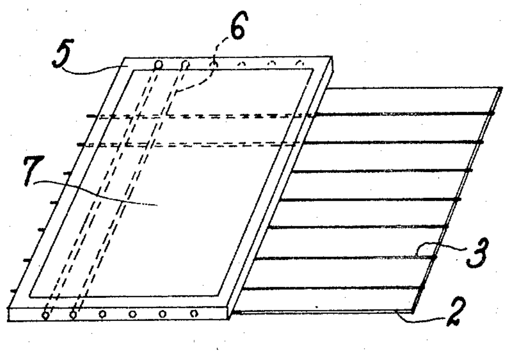

The formation of the housings in the form of tunnels which will serve as passageways for the magnetic wires of the memory plane is illustrated in FIGS. 3 and 4. A thread or wire 6 having a diameter of approximately 200 μ is first wound on a metallic frame 5 (as shown in FIG. 3). Said thread or wire has a high breaking point and high elasticity in order to permit of ready demolding by reduction in diameter under the action of tractive force. Either a nylon thread or wire formed of nickel-chrome alloy can be employed for this purpose. The winding operation is carried out in such a manner as to ensure that the lengths of thread (or wire) are strictly parallel to each other and located in the same plane. The constant spacing between the threads is ensured by means of spacer wires. The thread (or wire) is stretched over its frame, degreased, coated with a demolding agent and laid flat (as shown in FIG. 4) over approximately one-half of the layer of enamel threads 3 and at right angles to these latter. This flat assembly of molding threads or wires is then covered with a molding substance 7 such as an epoxy resin, for example, and the other half of the layer of enamelled wires is folded back against said assembly while ensuring that the wires which constitute the outward and return portions of the word lines are superposed with the greatest possible accuracy. A roller is passed in the direction of the molding threads in order to discharge any excess resin and to eliminate any air bubbles which may have formed during the operation. The pressing operation is then carried out at a temperature which is at least equal to 20° C in order to ensure good polymerization and correct hardening. After hardening, the molding threads 6 are withdrawn, thus forming tunnels within the mass of the resin 7.

Figure 5:
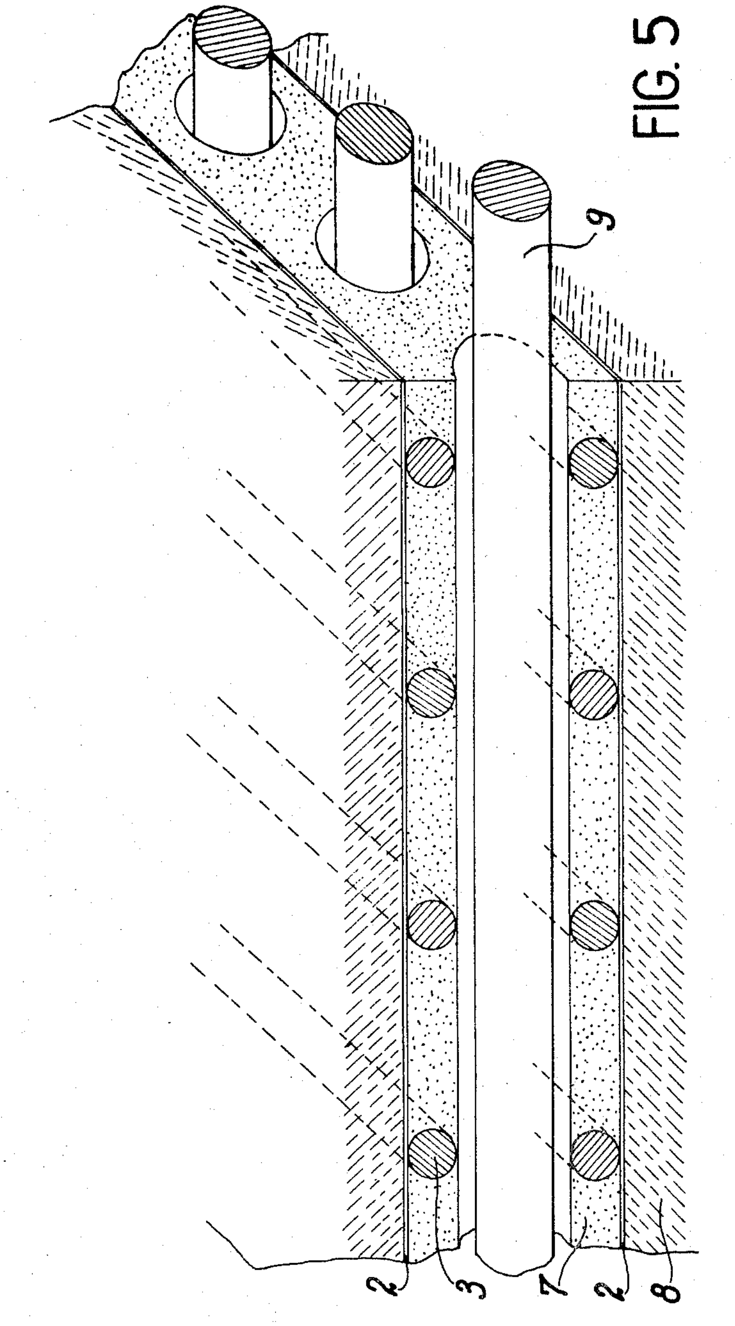
FIG. 5 illustrates a wired memory plane in accordance with said first alternative embodiment.

The plane which is obtained and illustrated in FIG. 5 is then bonded to a support 8 of epoxy glass by means of the unused face of the adhesive material 2. The top face of the plane is protected either by a layer of varnish or by a bonded sheet formed of a substance manufactured by the firm of Dupont de Nemours and marketed under the trade name Kapton. The magnetic wires 9 are then inserted into the tunnels and the memory plane is ready to be wired.

This technique can be modified in a number of different ways. When the magnetic wire 9 has been prepared and tested continuously on an electrolytic bench, it is possible in particular to contemplate continuous winding of said wire. In this case, it is only necessary to employ a drum having a polygonal cross-section with ground faces and designed to rotate at constant speed. There is then placed on each face a layer of enamelled lead-wires which are parallel to the axis of the drum and a flat array of parallel magnetic wires is formed by winding under constant tension on each half of the different layers. Molding is then carried out on each face of employing the technique which has been described above. The magnetic wires are therefore no longer housed within tunnels but directly embedded in resin.

This solution is particularly advantageous in the case in which the magnetic wires employed have a very small diameter (approximately 50 $\mu$) and cannot be inserted into the tunnels.

In a second alternative embodiment of the method according to the invention, the layer of lead-wires is constructed in the form of a printed circuit. The method accordingly entails the following successive operations :

placing a first plate of pre-polymerized epoxy resin over approximately one-half of the layer of lead-wires ;

placing on said plate of a flat network of substantially parallel molding threads which are located at right angles to said lead-wires ;

placing of a second plate of pre-polymerized epoxy resin on said network ;

folding of the other half of the layer of lead-wires against the second resin plate ;

hot-pressing of the complete assembly ;

withdrawal of the molding threads after bonding so as to form a single unit followed by setting of the two resin plates, the magnetic wires being then inserted into the housings in the form of tunnels which are left by said molding threads.

The layer which is to be folded in two and consists of parallel lead-wires which are insulated from each other is fabricated in accordance with this second alternative embodiment so as to form a printed circuit. To this end, use is made of a flexible support of epoxy resin which may contain a web of glass fibers and one face of which is metallized be deposition of copper. The parallel lines which are to constitute the word lines of the memory plane are obtained by chemical etching of this copper coating.

As in the first alternative embodiment, either a nylon thread or a wire formed of nickel-chromium alloy is employed for molding of the tunnels. Said thread or wire is stretched over a rigid frame so as to ensure that the adjacent lengths are strictly parallel to each other and located in the same plane.

Figure 6:
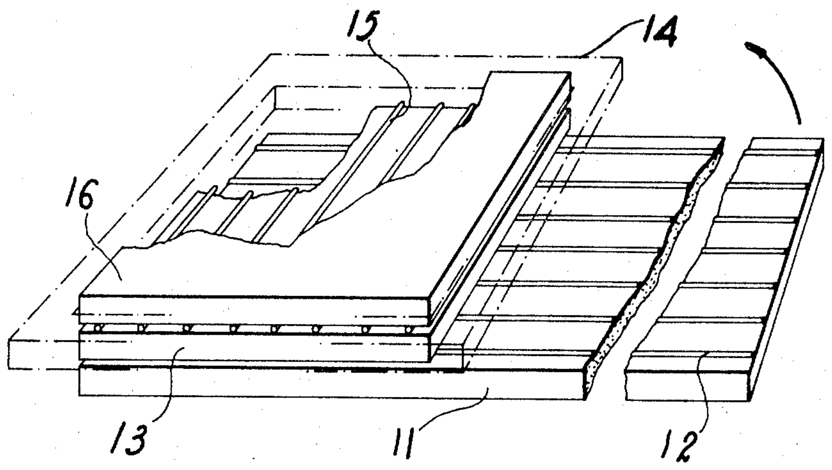
FIG. 6 illustrates a second alternative embodiment of the method according to the invention in which the memory plane comprises a layer of lead-wires which is constructed in the form of a printed circuit.

After formation of the layer of lead-wires and the network of molding threads, the actual fabrication of the memory plane is then carried out. In FIG. 6, the flexible support of epoxy resin is designated by the reference numeral 11 and the lead-wires which are obtained by chemical etching of the copper coating are designated by the reference numeral 12. Said layer is stretched out flat and there is then placed over approximately one-half of said layer a first plate 13 of pre-polymerized epoxy resin which may contain a web of glass fibers if necessary. The rigid frame 14 over which the molding threads (or wires) 15 are stretched is applied against said first plate, said molding threads being located at right angles to the lead-wires 12. Said frame is then covered by a second plate 16 of pre-polymerized epoxy resin which is identical with the first plate. The second half of the layer of lead-wires is then folded back against the stack formed by the network of molding threads and the two resin plates which constitute a sandwich element while taking care to superpose the two lengths of each wire with the greatest possible accuracy. The complete assembly is then subjected to hot-pressing under the following conditions which are naturally given by way of example :

Pressure : 10 to 15 kg/cm $^2$

Temperature : 170° C

Time : 30 minutes.

Under the combined action of pressure and temperature, the epoxy resin which forms both the flexible support 11 for the folded layer of lead-wires and the two plates 13 and 16 is bonded after melting followed by thermosetting so as to form a very homogeneous one-piece structure. The molding threads 15 can then be withdrawn and replaced by magnetic wires. The frame 14 is finally removed by sawing and the memory plane is ready to be wired.

It was mentioned earlier that the epoxy resin which forms the support 11 and the plates 13 and 16 may or may not contain a web of glass fibers. Although it proves easier in practice to mold a resin which does not contain fibers, there is a resultant disadvantage in the need for preliminary insulation of the word lines, for example by means of a varnish. Conversely, a resin which contains fibers does not require any insulation of word lines but is liable at the time of molding to cause deviation of the tunnels and this makes it necessary to place said fibers diagonally with respect to the molding threads.

The technique which has just been described admits of an alternative form which no longer requires the use of a frame for the purpose of stretching the molding threads. In fact, it is possible to form the network of molding threads by winding on a flexible adhesive sheet which is placed on a cylinder and then cut out along a generatrix of said cylinder. A network of spacer threads can also be deposited on the adhesive sheet and said spacer threads are arranged in alternate sequence with the molding threads. The layer which is thus obtained is then applied against one of the plates of pre-polymerized resin, the threads being in contact with the resin. This assembly is then subjected to hot-pressing so as to bond the threads to the plate which must not be completely polymerized. The conditions of pressing can be as follows :

Pressure : 5 kg/cm$^2$

Temperature : 120° C

Time : 5 minutes.

When the bonding has been completed, the adhesive sheet is removed. The resin plate which carries the molding threads and possibly also the spacer threads is then laid on one-half of the layer of lead-wires, then covered by the second resin plate before folding-back the other half of said layer and carrying out the pressing operation as indicated in the foregoing.

It is readily apparent that the layer of word lines can be formed by winding as in the first alternative embodiment of the method. The only difference between the first technique as hereinabove described and the technique in accordance with the second alternative embodiment lies in the use not of liquid resin but of plates of pre-polymerized resin.

This second mode of execution of the method has two essential advantages over the first mode of execution which was described at the outset. On the one hand, the technique is simplified by the use of pre-polymerized resin plates which are easier to handle than liquid resin. Moreover, the memory plane as constructed forms a single unit which has distinctly superior resistance to ageing and to temperature than that of a plane of word lines deposited on an adhesive sheet which is simply bonded to the molding resin and affords low resistance to heat build-up.

The third alternative embodiment of the method according to the invention entails the following operations :

arrangement of said layer of parallel electric lead-wires on a support ;

winding and bonding of an assembly of parallel and adherent spacer threads over a maximum of one-half of the area of said layer of lead-wires, said spacer threads being intended especially to form housings for said parallel magnetic wires, and cutting-out of said assembly along a straight line which is not parallel to said spacer threads ;

folding-back said layer of lead-wires completely and at least once on each side of said assembly so that each of said lead-wires forms at least one loop which surrounds said spacer threads ;

bonding of said spacer threads to said lead-wires ;

insertion of said magnetic wires into said housings, said assembly and said electric lead-wires being maintained together by virtue of the adhesion of said spacer threads.

In accordance with a sub-variant, said magnetic wires are positioned in said housings prior to folding-back of said layer of electric lead-wires, in which case said housings are in the form of grooves each constituted by the walls of two adjacent spacer threads.

In accordance with another sub-variant, said magnetic wires are inserted into said housings after said folding-back operation, said housings being in the form of tunnels constituted by the walls of said spacer threads and by said folded-back lead-wires.

Said parallel electric lead-wires can either form part of a printed circuit or form an assembly of wires which are wound on a support.

Said layer of lead-wires can be folded-back a number of times around said assembly of spacer threads so that each of said lead-wires should form a plurality of loops in series which surround said assembly without any discontinuity.

Said winding is preferably formed on a drum and said cutting-out operation is carried out along a generatrix of said drum.

The third alternative mode of execution of the method according to the invention is based on the use of adherent wires. These wires are usually made up of an electrically conductive core (of copper, for example), of a protective and electrically insulating enamel deposit and of an adherent coating which covers said deposit. It should be noted that said coating becomes adherent only as a result of treatment of the wire. This is achieved either by dipping the wire in a solvent or subjecting this latter to a heat treatment such as heat build-up by Joule effect or by heating in an oven. Wires of this type are in wide industrial use. However, for the purpose of forming the assembly of spacer threads, it may prove advantageous to make use in this case also of adherent but electrically insulating threads (for example, nylon threads covered with an adherent coating). The use of adherent threads or wires makes it possible to dispense with the bonding and molding operations which are usually necessary for the construction of wired magnetic memory planes.

Figure 7:
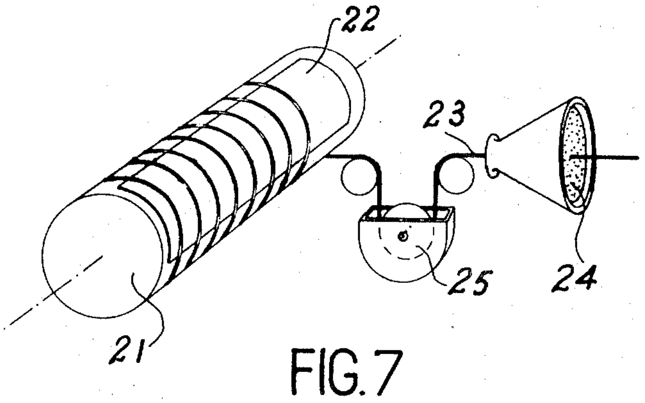
FIGS. 7 to 19 illustrate a third alternative embodiment of the method in which use is made of adherent wires.
Figure 8:
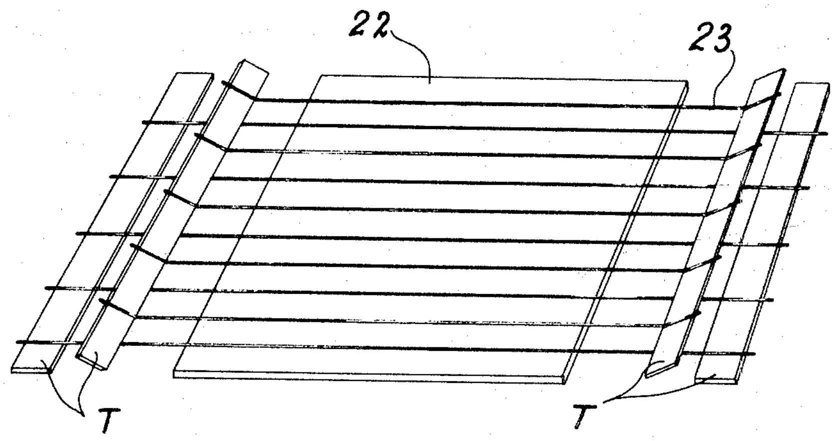

In order to form the layer of parallel electric lead-wires, two alternative modes of operation can be contemplated. It is thus possible either to make use of a printed circuit on which said parallel electric lead-wires have been etched or alternatively to wind said wires. The last-mentioned operation is illustrated in FIG. 7 and an enamelled and adherent electric lead-wire is employed in this case. In point of fact, in accordance with one of the characteristic features of the third alternative embodiment, it is not necessary to ensure that the support 22 is adhesive. An enamelled and adherent electric lead-wire 23 is first freed from impurities by passing said wire through a conical filter 24 made of compressed polyester foam, is then passed into a tank 25 containing a solvent and is then wound onto the support 22 around the drum 21. The distance between two adjacent wound wires and therefore the winding pitch is selected as a function of the characteristic of the memory to be fabricated. As it passes through the solvent, the plastic coating of the wire 23 undergoes a softening process together with a slight swelling and thus becomes adherent : said wire is therefore bonded to the support 22 progressively as it is wound onto the drum. In order to ensure more rapid volatilization of the solvent which has the effect of wetting the wound and bonded wire, it may prove useful to blow hot air onto the wound wire. According to another method of bonding the wire 23 to the support 22, the need to pass the wire through the tank 25 is dispensed with and the drum 21 containing the adherent wire 23 which is wound onto the support 22 is placed in an oven at a temperature of 130° C for a period of 10 minutes, for example. This heat treatment can also be carried out by Joule effect and this consists in increasing the temperature of the wire 23 by passing an electric current through said wire. The wound wire 23 is then cut from the support along a generatrix of the drum 21 and there is obtained as shown in FIG. 8 the flat layer of parallel electric lead-wires 23 which are bonded to the support 22. Sorting of the wires which are intended to constitute the inputs and outputs of lines of electric conductors can be carried out subsequently to this operation by means of strips T, for example. It is worthy of note that the enamelled wire 23 is bonded to the support 22 by means of its adherent layer. However, this layer is not polymerized and retains its initial properties. In other word0, those surfaces of the wire which have not been bonded to the support 22 can still be bonded either by means of a solvent or by heat treatment.

Figure 9:
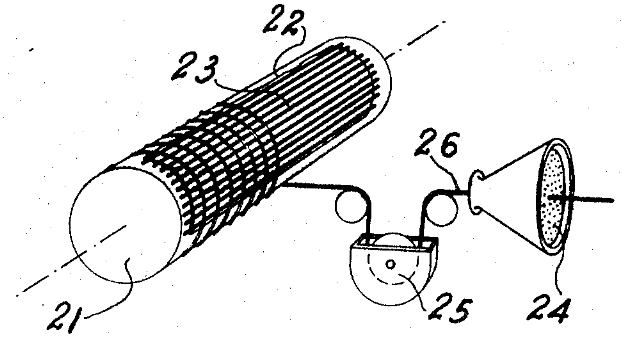
Figure 10:
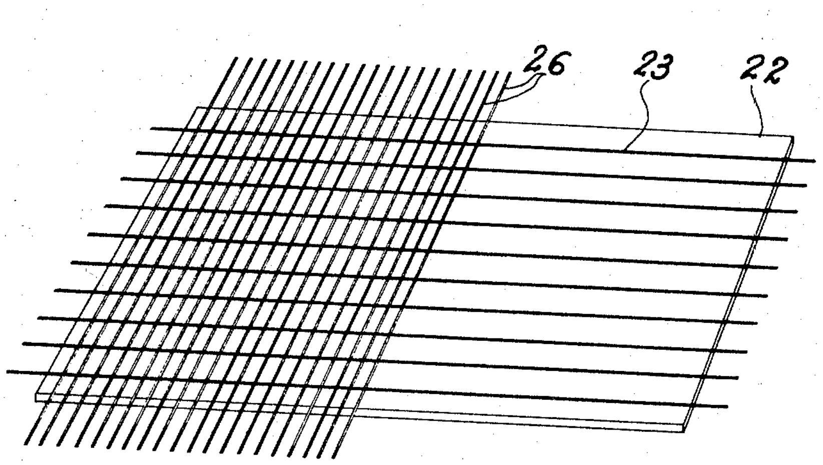

FIG. 9 shows the method adopted for winding the layer of spacer threads. The support and the layer of electric lead-wires are placed on the drum 21 in such a manner as to ensure that the electric lead-wires 23 are parallel to the axis of the drum. An adherent thread 26 is then wound onto the layer of electric lead-wires 23 after passing through the conical filter 24 for cleaning purposes and through the tank 25 which contains the solvent. The adherent thread 26 is either electrically insulating or conductive and electrically insulated (enamelled wire, for example). When the thread 26 is insulating, it serves solely to delimit housings in which the magnetic wires are intended to be positioned. On the other hand, when said thread is an electrically conductive wire, it can be employed for guarding against the phenomenon of crosstalk by grouping together two adjacent spacer wires as well as the magnetic wire contained between said two spacer wires in order to form a three-wire line. The thread 26 is wound to a maximum extent only over one-half of the assembly of electric lead-wires 23. As in the previous case, bonding of the adherent thread can be carried out while dispensing with the need for passing through solvent and by subjecting the thread (or wire) 26 to heat treatment consisting, for example, in placing within an oven the drum 21 containing the thread 26 which is wound onto the layer of electric lead-wires 23. The spacer threads are then cut from the support 22 along a generatrix. There is thus obtained as shown in FIG. 10 a flat assembly of spacer threads 26 which are bonded to the asmembly of electric lead-wires 23 and these latter are in turn bonded to the support 22, the spacer threads 26 being substantially perpendicular to the electric lead-wires 23. As in the previous instance, the adhesive of the adherent threads has not been polymerized and therefore retains its initial properties.

Figure 11:
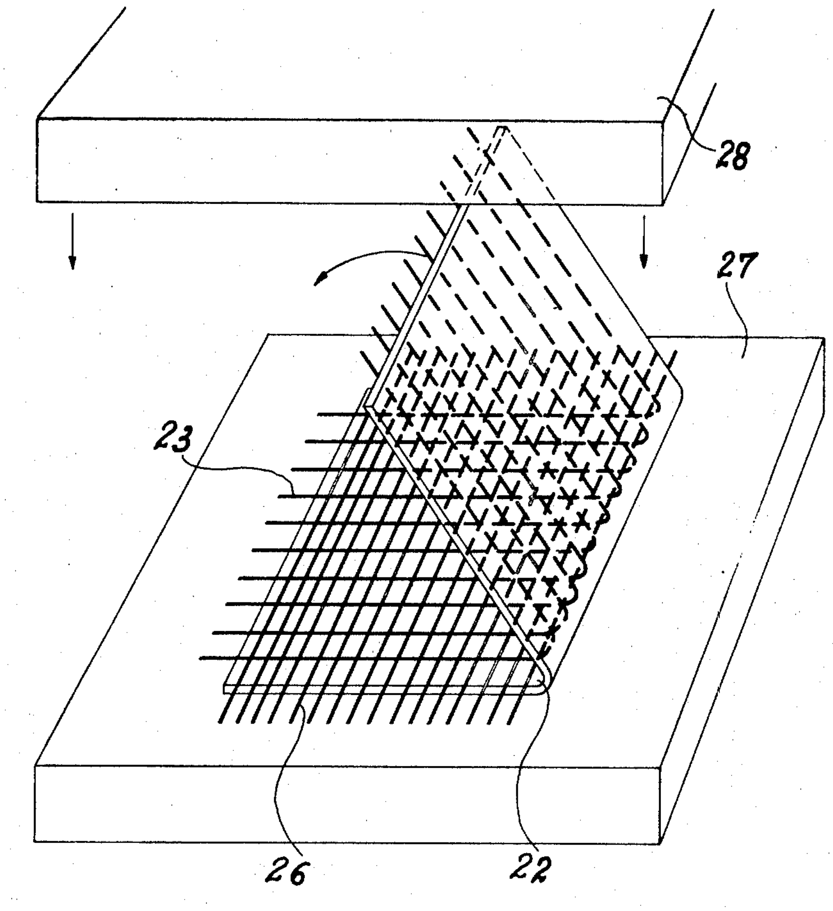

Positioning of the magnetic wires can be carried out in two different ways according as the housings of the magnetic wires are provided in the form either of tunnels or of grooves. The formation of tunnels for housing the magnetic wires is shown in FIG. 11. The support 22 on which the electric lead-wires 23 and the assembly of spacer threads 26 are fixed is laid on a surface-ground plate 27. That half of the area of the layer of electric lead-wires 23 which is not covered by the assembly of spacer threads 26 is then folded against the other half while surrounding the spacer threads 26 and superposing the electric lead-wires 23. A second surface-ground plate 28 is then placed on the folded support and the entire unit is placed between the heating plates of a press or more simply within an oven in which the adherent layer of wires 23 and threads 26 is allowed to polymerize for a period of 1 hour, for example, at 130° C. Each electric lead-wire 23 thus forms a loop which surrounds the assembly of spacer threads 26. The magnetic wires will be housed within the tunnels which are delimited by two adjacent spacer threads and by the series of loops which are formed by the electric lead-wires 23. The magnetic wire is inserted into a tunnel either by pushing or pulling said wire by means of a needle to which one end of the magnetic wire has previously been soldered. This operation calls for very special care and it can prove advantageous to position the magnetic wires within grooves instead of tunnels prior to folding of the support 22.

Figure 12:
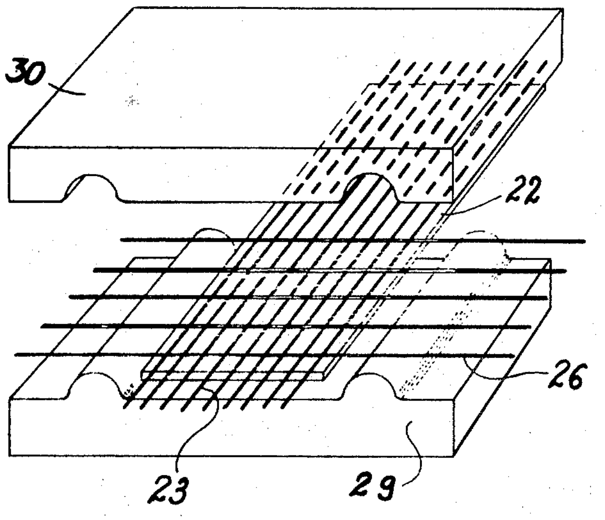
Figure 13:
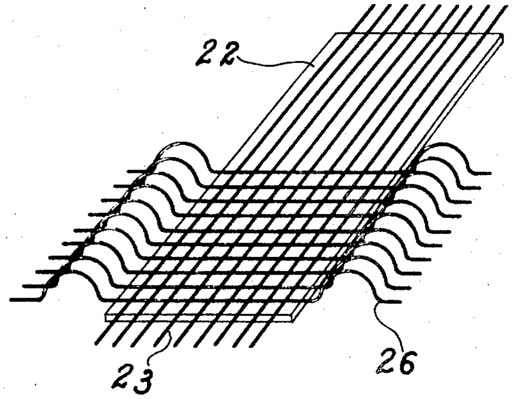
Figure 14:
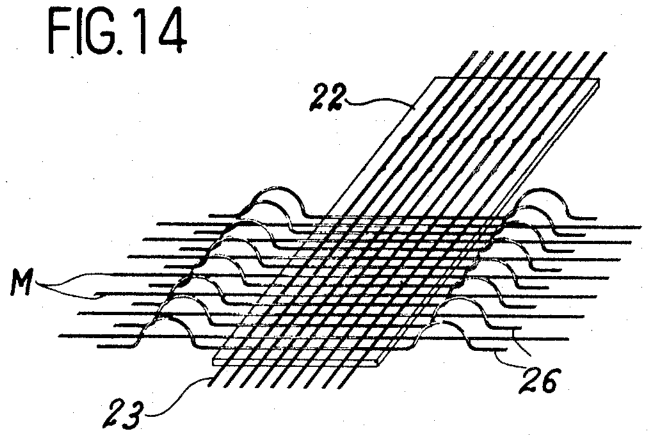

With this objective, use is made of two plates 29 and 30 as shown in FIG. 12. Each plate has a flat surface which is located between two male surfaces in the case of the plate 29 and two female surfaces in the case of the plate 30. The support 22 on which the electric lead-wires 23 are laid and the assembly of spacer threads 26 are placed on the flat surface of the plate 29. Those extremities of the spacer threads 26 which are located outside the support rest on the male surfaces of the plate 29. When the plate 30 is pressed agains the plate 29, the ends of the spacer threads 26 are arched in the manner which is illustrated in FIG. 13. The magnetic wires M are then inserted into the grooves which are each formed by the walls of two adjacent spacer threads and the positioning of said magnetic wires is greatly facilitated by virtue of the relief which is given to the spacer threads 26 as shown in FIG. 14. That half of the layer of electric lead-wires 23 which is not covered by the assembly of spacer threads 26 is then folded-back around the layer of spacer threads 26 and covers one-half of the electric lead-wires 23. The assembly is then bonded under a press in the hot state in the same manner as before, for example, between the plates 27 and 28. The shape of the plate 28 must accordingly be slightly modified in order not to flatten the relief which is given to the extremities of the spacer threads 26 or in other words to ensure that the width of the plate 28 is substantially the same as the width of the support 22. It is also possible to employ plates 27 and 28 having the shape of the plates 29 and 30. In order to facilitate fitting of the magnetic wires M, a small tractive force can be applied to said wires or these latter can alternatively be subjected to a negative pressure in order to apply the wires within the grooves. The entire system for fitting magnetic wires M can be rendered automatic.

The diameter of the magnetic wire is smaller than that of the spacer thread in order to prevent any stress at the moment of bonding as this would be detrimental to the magnetic properties.

Figure 15:
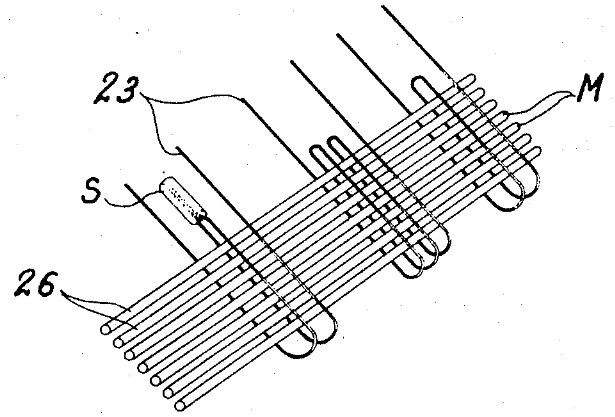
Figure 16:
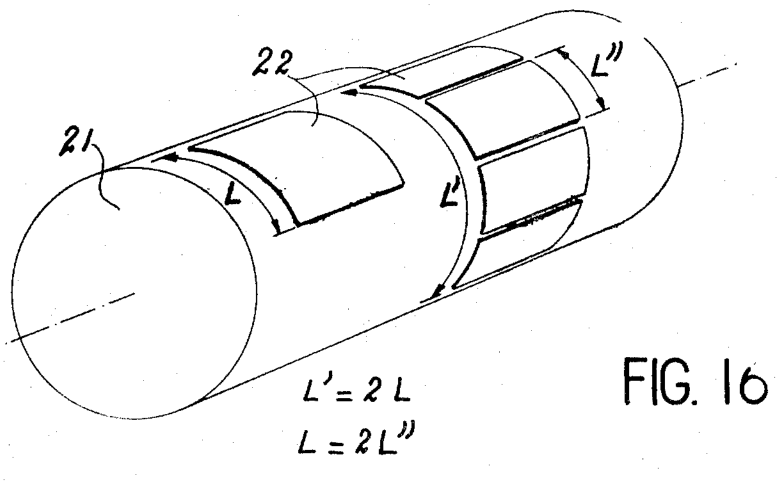

In order to obtain a better distribution of the magnetic field in the magnetic wire and in order to reduce the currents which circulate within the electric lead-wires 23, it is an advantage to ensure that each wire 23 no longer forms a single loop which surrounds the magnetic wires but a plurality of loops as shown in FIG. 15. In the devices of the prior art, a double loop was formed by means of a crossed soldered joint S at the two ends of two electic lead-wires 23. However, the use of adherent enamelled wires for the electric conductors makes it possible to form a plurality of loops in series without any discontinuity. In FIG. 15, there are thus shown two electric lead-wires which form two loops and three loops respectively. To this end, it is necessary to divide the support 22 into *n* parts instead of two equal parts although this division can clearly be fictitious when the support 22 is flexible.

Figure 17:
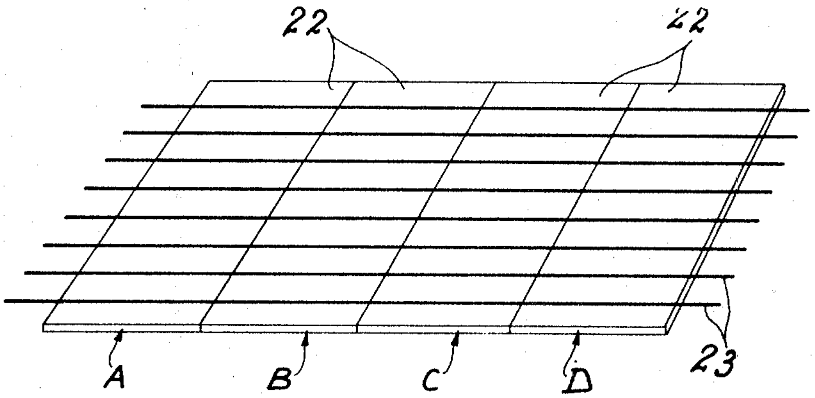
Figure 18:
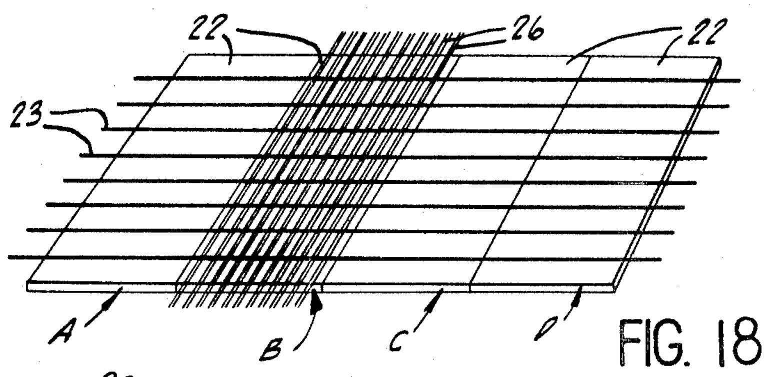
Figure 19A:
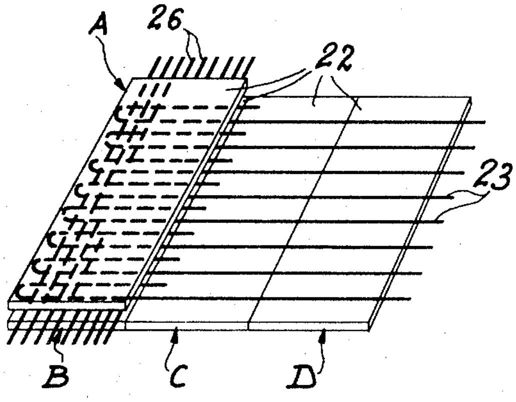
Figure 19B:
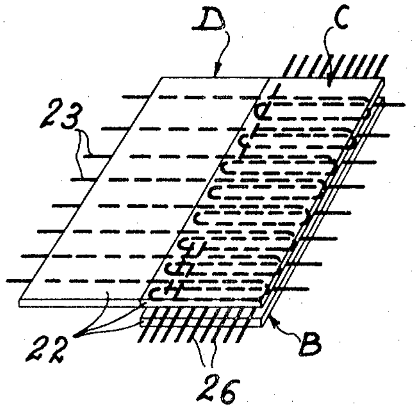
Figure 19C:
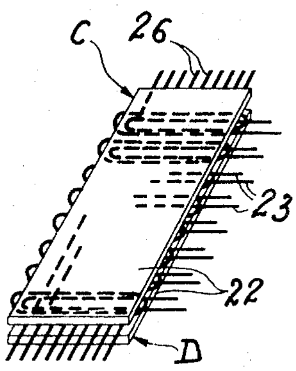

FIGS. 16 to 19 show the procedure to be adopted in order to obtain electric lead-wires 23 each forming two loops around the assembly of spacer threads 26. To this end, it is only necessary to take four identical supports having a width which is the same as in the previous instance but a length L'' which is one-half the length L of the support 22 as mentioned earlier and illustrated in FIG. 7. The electric lead-wires 23 are wound on the support 22 as in the previous example and secured to the drum 21. As shown in FIG. 17, there is thus obtained a layer of electric lead-wires 23 which are wound on the four identical supports A, B, C and D. The assembly of spacer threads 26 is then wound, not on the supports A and B as in the previous instance, but only on the support B as shown in FIG. 18. It then only remains to fold-back the supports against each other in order to obtain the memory plane. The plane A is first folded-back against the plane B as shown in FIG. 19*a*, both A and B are placed in a press between two surface-ground plates for a period of approximately 5 minutes at 130° C, for example, and the support A can then be removed by reason of the fact that the adherence between wires is much greater than the adherence between wires and supports. The support C is then folded-back against A as shown in FIG. 19*b*, the supports C and B are placed in a press between two ground plates for a period of approximately 5 minutes, for example, at a temperature of 130° C. The support B is removed and the support D is folded-back underneath the support B as shown in FIG. 19*c*. The complete unit is placed between two ground plates and the polymerization which is then carried out takes place by way of indication over a period of 1 hour at 130° C. Each electric lead-wire 23 thus forms two loops without any discontinuity but it is wholly apparent that a plurality of loops can be obtained by proceeding in the same manner with more than four supports.

The support 22 of the memory plane can be of any desired type provided that it is compatible with the adherent layer of the wire 23. Said support can be electrically insulating and fabricated, for example, from epoxy glass or from mylar or it can be conductive or magnetic.

If the support is too rigid or too delicate to be wound on a drum, use is initially made of a flexible support ; the same operations which consist in winding the drive lead-wires and spacer threads are again performed but, in this case, bonding instead of polymerization is carried out at the time of the final operation ; in consequence, the wires are bonded together and the flexible support which has much lower adherence is then withdrawn and replaced by the final support. The process is then completed by polymerization under pressure.

This third alternative mode of execution of the method makes it possible to obtain a much higher degree of accuracy in the pitch of winding of the wires 23 and threads 26 by virtue of the fact that the resin which had previously been employed is dispensed with. In fact, shrinkage of these resins frequently takes place in an uncontrollable manner and this is detrimental to the requisite degree of precision. Furthermore, this method of fabrication makes it possible to form windings with very small pitches and therefore to obtain a high density of memory cores : by way of example, the pitch of spacer threads 26 having a diameter of 100 microns can be 200 microns. When the memory plane is completed, it is also possible to coat this latter completely while leaving the molding threads within the tunnel-housings during this operation. After the coating process, said molding threads are withdrawn and the tunnels are not obstructed. Since the memory plane is already bonded prior to coating, the lack of accuracy which arises from the use of resin is no longer a problem.

The support 22 and the electric lead-wires can form a flexible printed circuit. The spacer threads 26 which are employed in the embodiments herein described are enamelled lead-wires but use can clearly be made of adherent and electrically insulating threads (such as nylon threads, for example). The shape which is given to the extremities of the spacer wires or threads 26 by means of the two male and female surfaces 29 and 30 is given solely by way of example and other shapes can be adopted for this purpose. Finally, either the drive lead-wires or the spacer wires or threads can have any crossed-sectional configuration such as a square or rectangular shape (flat lead-wires, for example).

Compared with the methods of the prior art, the technique in accordance with the invention has the following main advantages :

- the magnetic wires which are housed within tunnels are readily interchangeable ;
- the layers of enamelled wires are formed by having recourse to winding techniques which are well known in industrial applications ;
- the outward and return word leads are superposed ; the magnetic field which is produced is therefore directed along the axis of the magnetic wire ;
- planes having very large dimensions can be constructed without difficulty ;
- there is no danger of short-circuiting between adjacent lines since the leads are materialized and insulated individually ;
- the density can be of a very high order ; in an extreme case, the lines of words can be juxtaposed ;
- the thickness of insulation between the magnetic wire and the word lead is very small (the thickness of the enamel being a few microns) ;
- it is possible to produce any configuration of word lines ;
- the number of soldered joints on enamelled wires is reduced.

We claim:

1. A method of fabrication of a wired magnetic memory plane comprising the steps of forming a layer of substantially parallel lead conductors which are insulated with respect to each other, placing said layer of parallel electric lead conductors on a support, winding and bonding an assembly of parallel and adherent spacer threads onto said layer of conductors such that said assembly covers a maximum of one-half the area of said layer of lead conductors, said spacer threads forming housings for parallel magnetic wires, cutting said assembly along a straight line not parallel to said spacer threads, folding said layer of lead conductors onto and around said assembly with said spacer threads perpendicular to said lead conductors so that each of said lead conductors forms at least one loop which surrounds said spacer threads, bonding said spacer threads to said lead conductors, inserting magnetic wires into said housings, said assembly of spacer threads and said electric lead conductors being maintained together by adherence of said spacer threads.

2. A method according to claim 1, said magnetic wires being positioned in said housings prior to folding of said layer of electric lead conductors and said housings being grooves between two adjacent spacer threads.

3. A method according to claim 1, said magnetic wires being inserted into said housings after said folding step, said housings being tunnels constituted by the walls of said spacer threads and by said lead conductors.

4. A method according to claim 1, said spacer threads being wound contiguously and said housings being formed by removal of alternate spacer threads.

5. A method according to claim 1, said spacer threads being wound with a pitch so that the free space between two adjacent spacer threads is at least equal to the diameter of said magnetic wires.

6. A method according to claim 1 said folding step being followed by a step of pressing between two flat surfaces said layer of spacer threads between said layer of folded lead conductors.

7. A method according to claim 2 including the step of curving the extremities of the spacer threads which project beyond said layer of lead conductors prior to folding said layer of lead conductors by pressing them between two male and female surfaces and then positioning said magnetic wires in said housings in the form of grooves each constituted by the walls of two adjacent spacer threads.

8. A method according to claim 1 including the step of forming said layer of parallel, electric lead conductors by an adherent and electrically inSulated lead conductor wound onto and bonded to said support.

9. A method according to claim 1, said bonding step being carried out by passing said adherent wire through a solvent prior to winding and then blowing hot air onto said adherent wire after winding to activate the evaporation of said solvent.

10. A method according to claim 1, said bonding step being performed by heating said adherent wires by Joule effect.

11. A method according to claim 1, said bonding step being performed by heating in an oven.

12. A method according to claim 1, said layer of lead conductors being folded a number of times on each side of said assembly of spacer threads, each lead conductor forming a plurality of continuous loops in series.

13. A method according to claim 1, said winding step being performed on a drum.

* * * * *